July 23, 1929.   G. S. FRAMBES, JR   1,722,244
REFLECTOR MECHANISM FOR AUTOMOBILES
Filed April 22, 1925   2 Sheets-Sheet 1
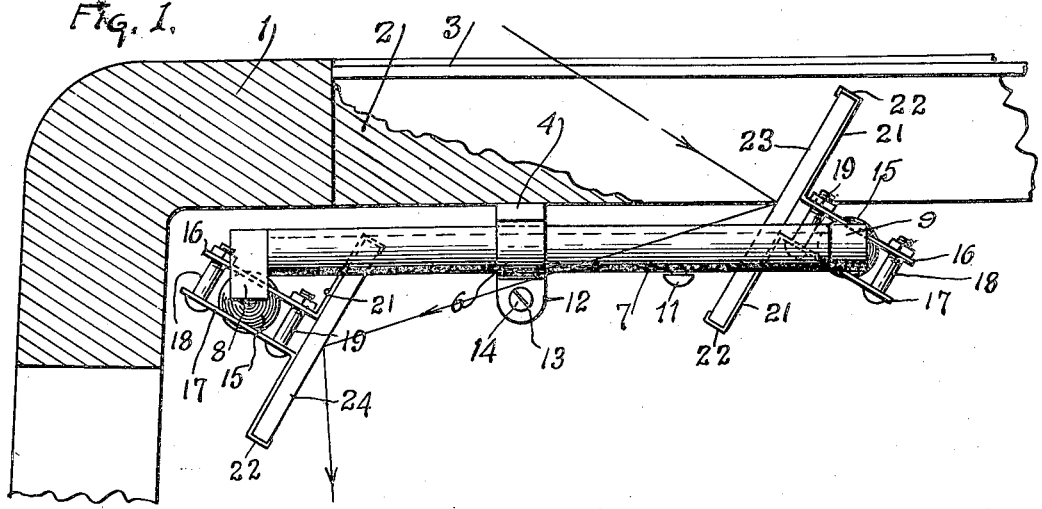
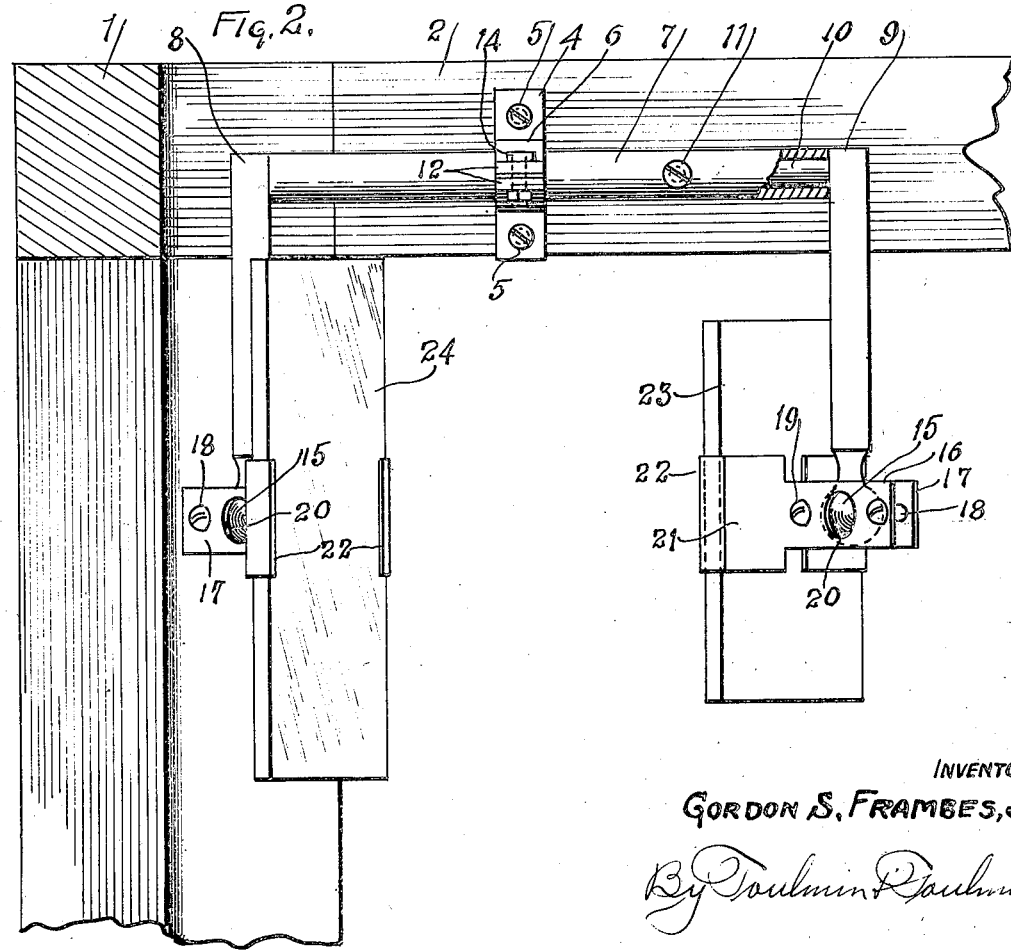
INVENTOR
GORDON S. FRAMBES, JR.
By Toulmin & Toulmin,
ATTORNEYS July 23, 1929.  G. S. FRAMBES, JR  1,722,244
REFLECTOR MECHANISM FOR AUTOMOBILES
Filed April 22, 1925  2 Sheets-Sheet 2
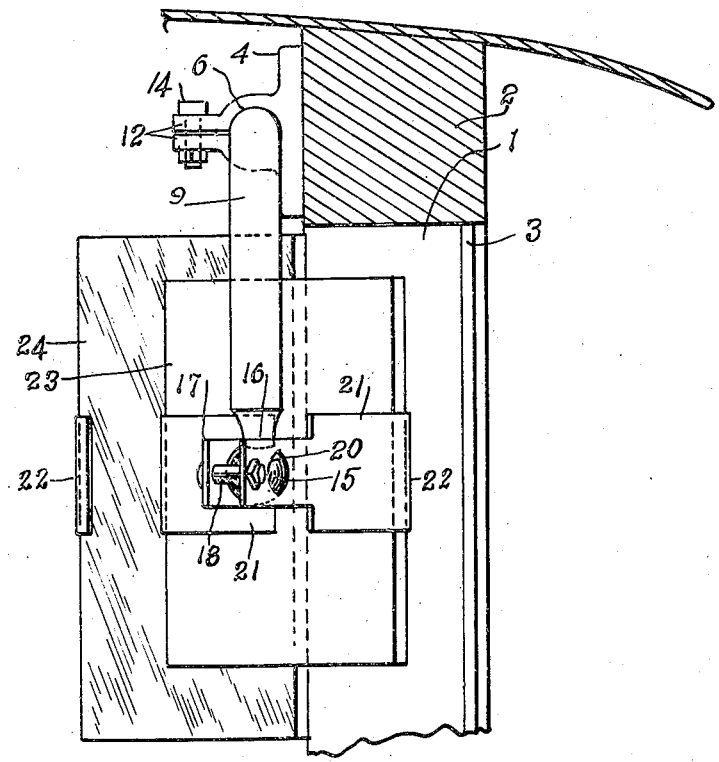
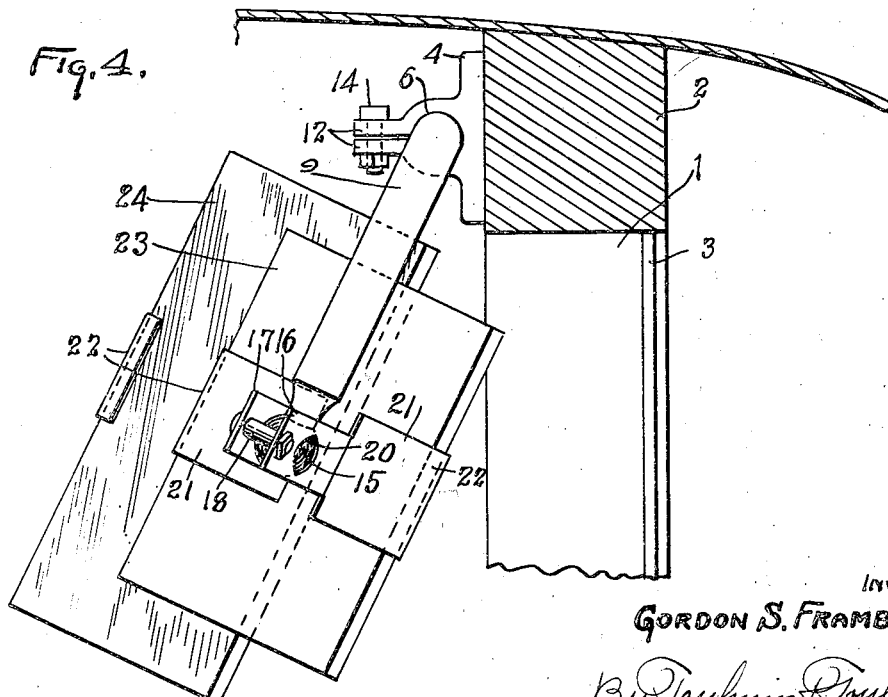
INVENTOR
GORDON S. FRAMBES, JR.,
By Toulmin & Toulmin,
ATTORNEYS Patented July 23, 1929.

1,722,244

UNITED STATES PATENT OFFICE.

GORDON S. FRAMBES, JR., OF COLUMBUS, OHIO.

REFLECTOR MECHANISM FOR AUTOMOBILES.

Application filed April 22, 1925. Serial No. 25,013.

My invention relates to a reflector mechanism particularly useful for automobiles to enable the operator to see objects which are hidden from his vision by the corner posts supporting the top of the vehicle.

It is my object to provide an automotive accessory easily attachable to existing automobiles in a position where it will not interfere with the operator's vision for the purpose of enabling the operator to see objects which are hidden by the corner post of the vehicle. These corner posts, whether they are parts of the windshield or are permanent parts of a closed body structure, are of appreciable thickness and width so that objects approaching to one side of the vehicle are hidden from the operator of the car by these corner posts. This has resulted in a large number of disastrous accidents. When automobiles are approaching each other at street intersections in particular the brief moment when they come into view ordinarily is lost because of each automobile being obscured from the other by the corner post thereof. It is my object to provide a reflecting system which will enable the operator to look in a forward direction and still see the object approaching at the side which would be otherwise hidden from his view by the corner post so that the operator will not have to take his eyes from the road or turn his head or lean to one side to avoid the corner post.

It is a further object to provide such a reflecting system which is adaptable to existing cars, which is readily attachable and which is so cheap that it may be sold as an accessory economically and which can be adjusted to varying dimensions of cars of various makes with various thicknesses and widths of corner posts and with varying details of construction of the roof or windshield.

It is my object to provide a universal reflecting device which is adaptable to any make of car and which can be adjusted to the particular make or model, thus economizing in production and in the cost to the user.

It is my object to provide a mirror system in which both mirrors will be within the vehicle enclosure and both in front of the operator and in such small compass that they will not interfere with the normal forward vision of the operator.

Referring to the drawings:

Figure 1 is a plan view of my reflector device suspended from the transverse forward roof member above the windshield which is partially broken away to show the reflector suspended to one side and beneath it. The corner post is also in section;

Figure 2 is an elevation of the device showing it attached on the inside of the vehicle;

Figure 3 is a side elevation showing the method of attachment to the transverse forward roof member which is in section; and Figure 4 is a similar view showing the device in tilted position which is sometimes necessary to accommodate the device to certain types of side posts.

Referring to the drawings in detail, 1 is the corner post of a vehicle, 2 is the transverse forward roof member which is located above the windshield 3 and to the rear of it. Upon this transverse roof member is mounted a bracket of suitable form which I have shown in my drawings as a plate 4 with attaching screw openings 5. This plate carries an eye 6. The eye 6 supports transversely behind the member 2 a tubular support 7. This tubular support carries at one end a depending arm or bracket 8 and the other end carries a similar arm 9.

The arm 9 is mounted upon a rod 10 which slides within the tube 7 so that there may be adjustability of the distance between the arms 8 and 9. This distance is fixed by the set screw 11 which is carried on the sleeve 7 and has its head engaging with the rod 10.

The collar 6 is split with a pair of right angle arms 12 having a bolt eye 13 so that the sleeve 7 may move laterally in the eye 6 and then be clamped by the split collar 6 through the agency of the members 12 and a bolt 14.

Suspended from the arm 9 which has a ball 15 on the end thereof, are a pair of plates 16 and 17 held together by the bolts 18 and 19 on either side of the ball 15. These plates have cut away portions 20 through which the ball 15 projects. Thus an adjustable ball and socket joint is provided. The plates 16 and 17 are provided with right angle wings 21 having U-shaped outer ends 22 for engaging a vertical strip 23 of mirror. This mirror it will be noted is relatively broad as compared to the mirror on the opposite side and relatively short. The purpose of this is to increase the field of this particular mirror laterally and to minimize the amount of obstruction it may afford to the forward vision of the operator who is substantially behind it. By keeping this mirror relatively short it is away from the general line of vision of the forward direction of the operator. The bolt 19 serves to afford a means of clamping the wings 21 on the mirror 23. It is obvious the mirror can be moved within the wings upwardly or downwardly to facilitate the adjustment. Thus I have an adjustment about the major axis of the tube 7. I have an adjustment laterally within the split collar 6. I have an adjustment through the sleeve 7 and the rod 10 between the arms 8 and 9. I have an adjustment at the ball socket between the plates 16 and 17 of the ball 15 and a vertical adjustment of the mirror within the wings 21.

On the other side suspended on the arm 9 is a similar construction to support the mirror 24. The mirror 24 has its face disposed at an angle to the forward vision of the driver and is so arranged that the driver can look in the mirror substantially as he would look forwardly to the road. Thus the mirror 23 being at a position where objects otherwise hidden by the corner post 1 will be picked up by it, reflects the image of this object to the mirror 24, which, being in the line of vision of the operator and partially facing the operator, reflects this image so that the operator can see the object in the mirror 24 which is substantially between the operator and the corner post so that the operator sees the otherwise hidden object just as if the corner post were not in the position it is.

Thus it is possible for the operator without moving to secure a result in his vision just as if the corner post did not exist. This eliminates the disastrous movements of the operator to one side endeavoring to see the objects or eliminates any disastrous results if he fails to take that precaution.

It will be realized that this device being hung from the roof member 2 of the vehicle is above the operator and does not interfere with his vision to any appreciable extent.

It will be understood that I do not desire to confine myself to the details of this apparatus, but comprehend within my claims such modifications as may be necessary to adapt it to varying uses and conditions of use.

Having thus fully described my invention, what I claim as new and desire to secure by Letters Patent, is:—

1. In combination, a transverse support, means to attach said support to the forward roof member of a vehicle, a pair of depending arms at either end of said transverse support, mirrors supported on the end of said arms, one facing forwardly at an angle and the other facing rearwardly at an angle so that the objects picked up by the forwardly facing mirror may be reflected in the rearwardly facing mirror to be observed by an observer.

2. In combination, a transverse support, means to attach said support to the forward roof member of a vehicle, a pair of depending arms at either end of said transverse support, mirrors supported on the end of said arms, one facing forwardly at an angle and the other facing rearwardly at an angle so that the objects picked up by the forwardly facing mirror may be reflected in the rearwardly facing mirror to be observed by an observer, said forwardly facing mirror being shorter relatively than the rearwardly facing mirror.

3. In combination, a transverse support, means to attach said support to the forward roof member of a vehicle, a pair of depending arms at either end of said transverse support, mirrors supported on the end of said arms, one facing forwardly at an angle and the other facing rearwardly at an angle so that the objects picked up by the forwardly facing mirror may be reflected in the rearwardly facing mirror to be observed by an observer, said forwardly facing mirror being shorter relatively than the rearwardly facing mirror, and relatively broader.

4. In combination, a transverse tubular member, a bracket supporting such member, said tubular member being adjustable therein and laterally rotatable, an arm carried on said tubular member at one end, a rod adapted to be adjustably mounted within said tubular member, an arm depending from said rod, mirrors carried on said arms, balls formed on the ends of said arms, socket clamps carrying said mirrors carried on said balls.

5. In combination, a transverse tubular member, a bracket supporting such member, said tubular member being adjustable therein and laterally rotatable, an arm carried on said tubular member at one end, a rod adapted to be adjustably mounted within said tubular member, an arm depending from said rod, mirrors carried on said arms, balls formed on the ends of said arms, socket clamps carrying said mirrors carried on said balls, one of said mirrors being relatively narrow and long and the other relatively short and broad.

6. In combination, a transverse tubular member, a bracket supporting such member, said tubular member being adjustable therein and laterally rotatable, an arm carried on said tubular member at one end, a rod adapted to be adjustably mounted within said tubular member, an arm depending from said rod, mirrors carried on said arms, balls formed on the ends of said arms, socket clamps carrying said mirrors carried on said balls, one of said mirrors being relatively narrow and long and the other relatively short and broad, said mirrors being adapted to be moved upwardly or downwardly in their supporting clamps.

In testimony whereof, I affix my signature.

GORDON S. FRAMBES, Jr.